Aug. 8, 1939.  W. F. BARRY  2,168,384
FLYING OBJECT AND APPARATUS FOR ITS SIMULATED FLIGHT
Filed Aug. 30, 1937  2 Sheets-Sheet 2
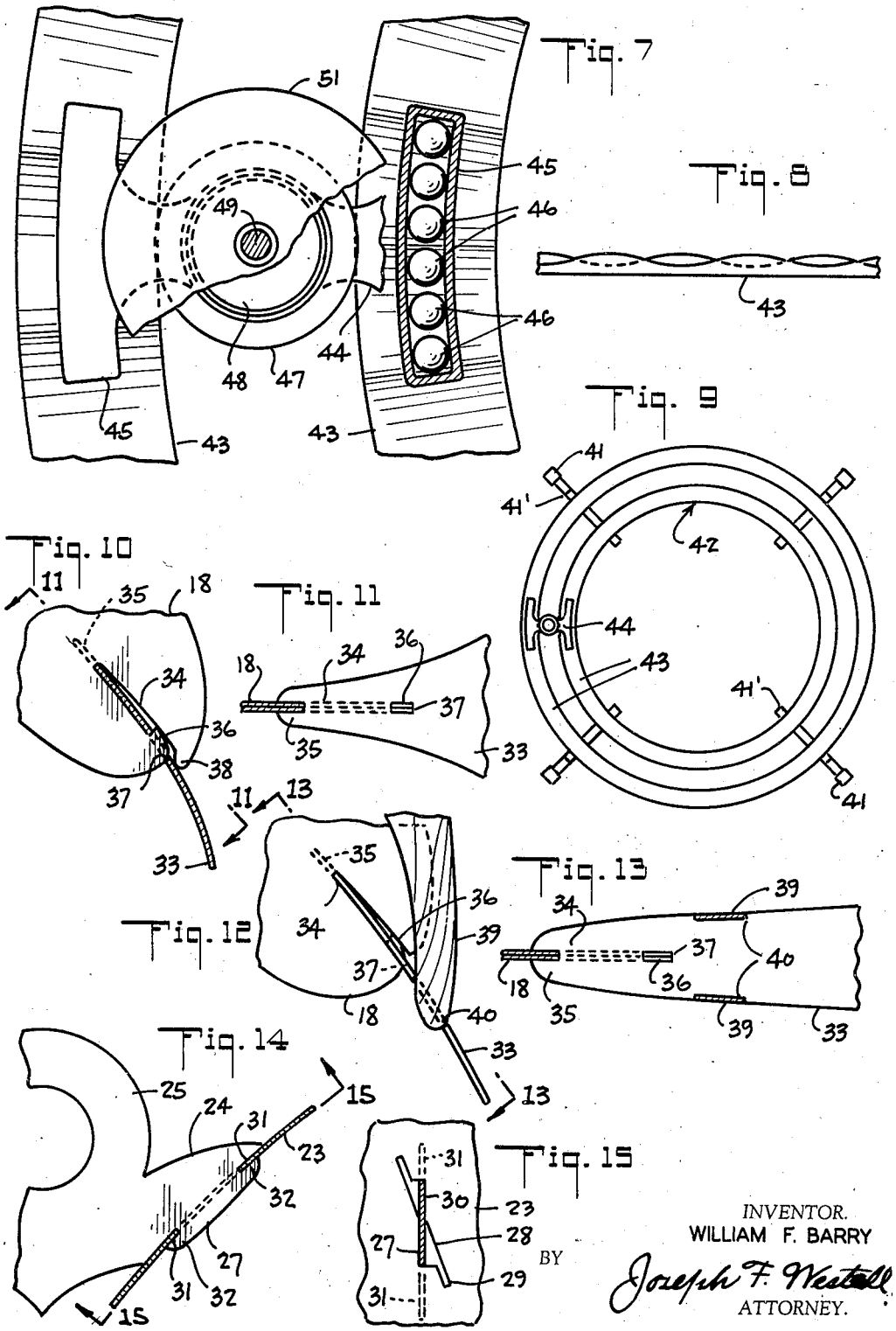
INVENTOR.
WILLIAM F. BARRY
BY Joseph F. Westall
ATTORNEY.

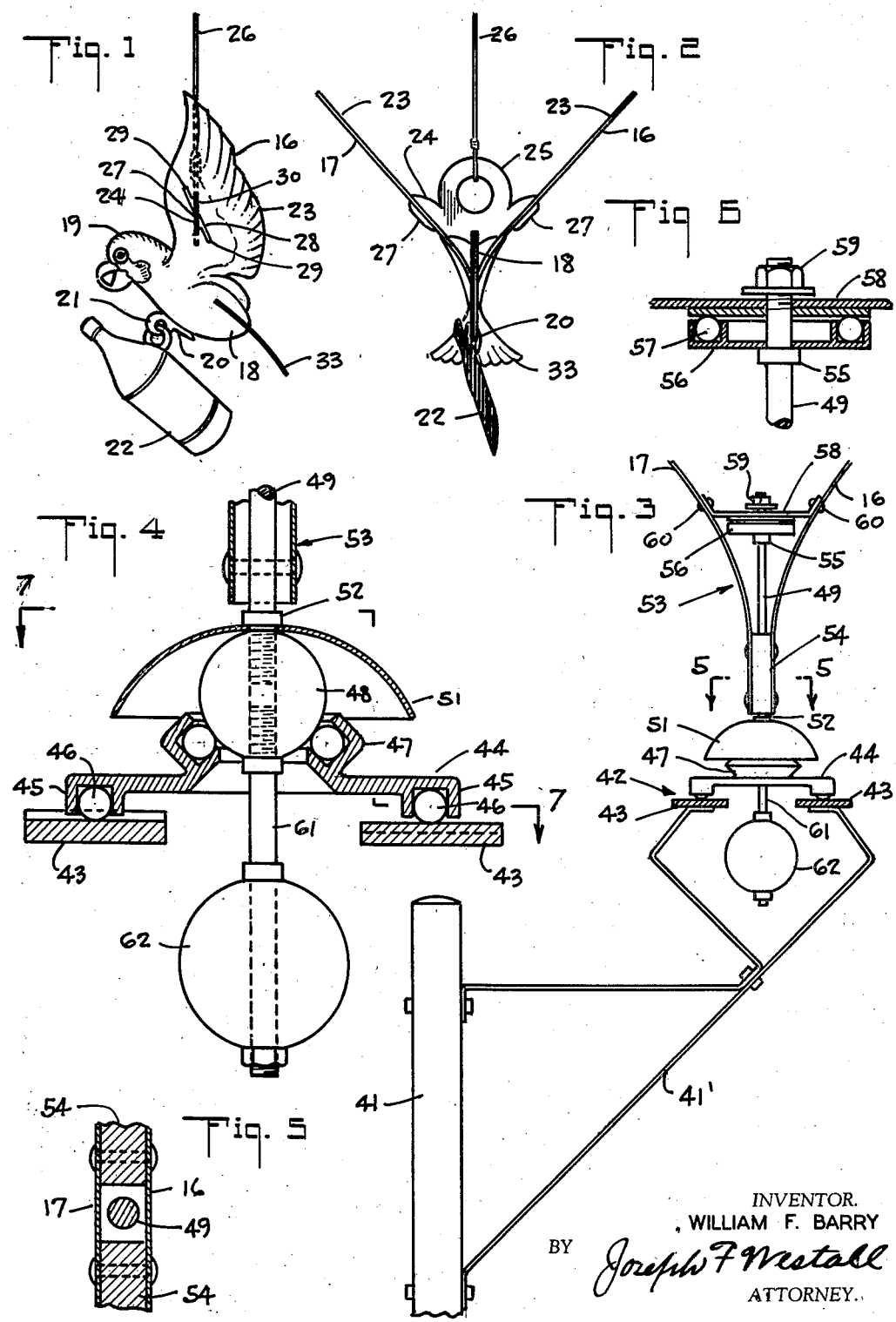

Patented Aug. 8, 1939

2,168,384

UNITED STATES PATENT OFFICE 2,168,384

FLYING OBJECT AND APPARATUS FOR ITS SIMULATED FLIGHT

William F. Barry, Los Angeles, Calif.

Application August 30, 1937, Serial No. 161,578

5 Claims. (Cl. 40—37)

This invention relates to artificial birds and apparatus for their simulated flight, and specifically to advertising mediums which by reason of their susceptibility to a pleasing use of color, and the suggestion of the eurythmy of represented natural birds, presents an attractive display to prospective purchasers adapted to induce an effective association of interest with a product offered for sale.

A primary object of the present invention is to provide an artificial bird or similar flying object of any color, shape or design, as, for example, an emulation of a manufacturer's trade-mark or symbol, having a plurality of surfaces upon which either natural or artificially created and directed air currents may operate to influence movement of the bird in a manner simulating natural flight.

Another object is to provide means, associated with an artificial bird of the character indicated, for the attachment of printed matter or a sample or representation of a product to be noticed, whereby it may be made to appear that the simulated bird is carrying the same in flight.

Another object is to provide an artificial bird having a flat body and removable wing and tail surfaces transverse to the body portion upon which motivating air currents may operate to animate the bird, whereby the relative position of said parts may be maintained by the utilization of naturally-appearing appendages of the particular bird represented.

Another object is to provide a standard having a rotatable and pivotal connection enabling rotary, lateral, arcuate, or tilting motion either simultaneously or successively in any direction of a bird representation carried thereby, which movement will be motivated by the counter-impulses afforded by air currents acting upon wing surfaces of the bird and a weighted balance tending to maintain the upright position of the bird.

Another object is to provide a carriage for the pivotal and rotatable support of an animated artificial bird in combination with an undulated tract over which the carriage is adapted to ride to thereby lend a fluttering motion to the bird throughout the range of its variable movement.

Numerous other objects and advantages will be apparent to those of skill in this art upon an examination of the following description read in the light of the accompanying drawings, in which—

Fig. 1 is a side elevation of one embodiment of my invention;

Fig. 2 is a front elevation of the embodiment hereof shown in Fig. 1;

Fig. 3 is an elevation of a modified form of my invention in which the artificial bird is supported on a standard;

Fig. 4 is an enlarged sectional view of the pivotal and rotatable connection of the bird to its supporting structure;

Fig. 5 is a sectional view taken on lines 5—5 of Fig. 3;

Fig. 6 is an enlarged sectional view of one of the bearing assemblies for the rotatable support of the bird;

Fig. 7 is an enlarged sectional view taken on lines 7—7 of Fig. 4;

Fig. 8 is a broken elevation of the undulated track of my invention;

Fig. 9 is a reduced plan view of the track;

Figs. 10 and 12 are enlarged sectional views partly in elevation of modifications of the tail of the present device;

Figs. 11 and 13 are enlarged sectional views on the correspondingly-numbered lines of Figs. 10 and 12, respectively;

Fig. 14 is an enlarged broken elevation of the spacer between the wings of the embodiment hereof shown in Fig. 1;

Fig. 15 is a section on line 15—15 of Fig. 14;

Referring to the drawings in detail the numerals of which indicate similar parts throughout the several views, 16 and 17 designate, respectively, two flat members composed of cardboard, metal, or other stiff, flexible material, which are formed identically, each having the contour of a bird in flight. The simulated body portions 18, heads 19 and feet 20, respectively, of the two members, are secured together by any means well known in the art. The claws 21 of the bird are preferably depicted as being closed to form a means of attachment for a placard containing advertising matter or a representation of the goods to be advertised, as, for example, a bottled product 22. The portions 23 of members corresponding to the wings of a bird extending above the composite body, are bent obliquely with respect to the body in opposite directions to provide surfaces upon which air currents may act to tilt, turn or swing the bird in a manner hereinafter more in detail described. To maintain the wing spread of the bird, a spacer 24 is transversely positioned between the wings. A hoop or ring 25 is either attached to or formed in the spacer to which a cord, wire, or rod 26, or the like, may be secured to furnish a flexible means of suspension for the bird.

The spacer may be removably attached to each wing (Figs. 14 and 15) by a tenon 27 formed integrally thereon which extends through an opening 28 in the wing. Opening 28 comprises a slot 29 disposed at an angle to the vertical when the bird is suspended in its normal position. Opposite edges of the slot are cut away intermediate the longitudinal center and opposite ends of the slot, to provide as part of opening 28 a vertically-disposed slot 30, transverse to and shorter than slot 29 with which it is in unrestricted communication. In the spacer a slot 31 is formed in opposite sides of each tenon 27 of a width substantialy equal to the thickness of the wing. The outer portions of each tenon overhanging respective slots 31 provide ears 32.

In operation each tenon is projected through respective slots 29 of the wings and the spacer is then turned to a vertical position moving the tenons into slots 30. The ears 32 thus resist displacement of the spacer by engaging the undersurfaces of the wings.

The function and appearance of the tail feathers of a natural bird are effected in my invention by a fan-shaped tail 33 comprising a member of naturally proportioned shape and size with respect to the body. A curved slot 34 formed in the rearward portion of the body is provided into which the bifurcated end of tail 33 is inserted, transversely to the plane of body 18. Bifurcations 35 of the tail engage opposite sides of the body adjacent the innermost end of slot 34. While tail 33 is shown as being curved downwardly to correspond to the slot 34, it will be obvious that both slot and tail may be formed in any manner depending upon the species of bird represented. An upward projection 36 of the portion of the body forming the lower wall of the slot closes the end of the slot by extending through a hole 37 in the tail, thus maintaining desirable relationship of the tail and body but enabling facile dissembly of the device.

The portion of the body at the upper side of the slot formed and colored to simulate a feather overhangs the lower portion of the body at the opposite side of the slot and is provided with a downward projection 38 adapted to bear against the tail to resist displacement of the same from projection 36.

A modification of the tail structure is illustrated in Figs. 12 and 13 wherein a projection 39 of the body portion above the slot 34 extends downwardly through an opening 40 in the tail, and by cooperating with the lower projection 36, maintains the stabilizer in removable attachment with the body.

In Figs. 3 through 9, inclusive, a slightly modified bird is supported on a standard comprising a post 41 to which an annular undulated track 42 is secured by means of one or more brackets 43. Track 42 consists of a pair of concentrically arranged runways 43 of different diameters and preferably of substantially equal width. The circumferences of the runways 43 are proportioned to permit their being spaced from each other a distance substantially equal to their individual widths for a purpose hereinafter made obvious.

A carriage 44 for the movable support of an artificial bird, later referred to, on the track comprises a pair of bearing races 45 curved to correspond to the contour of the track. Each race encloses a plurality of ball bearings 46 on which the carriage 44 is adapted to roll. A circular upwardly-oblique bearing race 47 of the carriage is carried between the runways 43 by races 45 for the rotative support of a pivot ball 48. A rod 49 threaded into a diameter bore 50 of ball 48 extends upwardly above the track 42. A perforated dome-shaped member 51 through which the rod 49 extends, overhangs race 47 and is clamped rigidly to the top of the ball by a shoulder 52 formed on the rod 49.

The two flat members 16 and 17 forming the body 53 of the bird in this embodiment are disposed on opposite sides of rod 49 and spaced apart a distance greater than the diameter of the rod by members 54 of any desired shape located respectively on opposite sides of the rod between the members, thus forming an opening in the body 53 through which the rod loosely extends, permitting unrestrained rotative movement of the bird with respect to the rod. Adjacent the upper end of rod 49 an increase in the diameter of the rod provides a seat 55 on which a bearing race 56 containing bearings 57 is carried for the rotative support of a horizontal wing spacer 58 of the bird. A nut 59, threaded on the upper end of rod 49, prevents accidental displacement of the spacer from the rod.

The upwardly diverging wings 23 of the bird are riveted or otherwise secured to the spacer 58 as shown at 60 (Fig. 3).

A second rod 61, threaded into the bore 50 of the ball 48, axially aligned with rod 49, extends downwardly below the ball, to which a counterweight 62 is attached to counteract the gravitation of the bird when tilted.

It will thus be seen that I have provided a supporting structure for an artificial bird of novel construction whereby the bird may be tilted or swung on a pivot in any direction, moved over the undulations of the circular track to simulate the fluttering of a bird in flight, or rotated freely on its own vertical axis solely in response to the pressure of air currents sufficient to overcome the inertia and motivation of the bird as influenced by the counterweight 62.

While I have described only a few of the embodiments to which my invention is susceptible, it will be apparent that numerous changes may be made in size, proportion, shape and design of the various parts as, for example, the length of rod 61 may be reduced or lengthened to modify the force of the air currents required to tilt the bird on ball 48 as well as to correspondingly vary the intensity of the momentum of rod 49 to its vertical position, impelled by gravitation of the weight; the race 47 may be held stationary and the track omitted from particular embodiments; and rod 49 may be longer to permit a wider range of movement of the bird—all without departing from the spirit of my invention as defined in the appended claims.

What I claim and desire to secure by Letters Patent is:

1. In a device of the character described, a circular track comprising a pair of rails, a carrier movable on said track, a supporting rod pivotally mounted on said carrier, a simulated flying object comprising a pair of members, each member conforming to the shape of a body portion and a wing portion of said object, and means to hold said members together and rotatably on said rod.

2. In a device of the character described, a track, a carrier movable on said track, a bearing in said carrier, a ball supported in said bearing, a rod secured to said ball, a simulated flying object comprising a body portion and a wing portion secured rotatably on said rod, and a counterweight to urge said rod to a position perpendicular to said track.

3. In a device of the character described, a simulated flying object having a body portion and wing portions, a track, means to support said body portion movable on said track including pivotal and rotatable connections to permit said object to tilt and rotate while moving along said track in response to air pressure on said wing portions.

4. In a device of the character described, a supporting post, a circular track comprising a pair of concentric rails, means to support said circular track on said post, a carriage movable on said track, a circular upwardly oblique bearing mounted in said carriage, a ball supported in said bearing, a rod secured to said ball extending above said track, and a second rod extending from the opposite side of said ball, a counterweight secured to said second rod to normally urge said first rod to a substantially vertical position, a pair of members conforming to the contour of a bird, each comprising a body portion and a wing portion, a block journalled on said first rod, said body portions being secured to opposite sides of said block, and means to hold said wing portions oblique with respect to each other and said rod.

5. In a device of the character described, a simulated flying object having a body portion and wing portions, a stationary member, means to support said body portion on said member including tiltable and rotatable connections to permit said object to tilt and rotate while supported above said member in response to air pressure on said wing portions.

WILLIAM F. BARRY.